March 12, 1968

G. SCHMIDT 3,372,630

APPARATUS FOR PROCESSING LIGHT SENSITIVE FILM

Filed June 4, 1965

INVENTOR.
GUNTHER SCHMIDT
BY

March 12, 1968 G. SCHMIDT 3,372,630
APPARATUS FOR PROCESSING LIGHT SENSITIVE FILM
Filed June 4, 1965 11 Sheets-Sheet 3

FIG. 3

INVENTOR.
GUNTHER SCHMIDT
BY

March 12, 1968 G. SCHMIDT 3,372,630
APPARATUS FOR PROCESSING LIGHT SENSITIVE FILM
Filed June 4, 1965 11 Sheets-Sheet 4

INVENTOR.
GUNTHER SCHMIDT
BY

March 12, 1968 G. SCHMIDT 3,372,630
APPARATUS FOR PROCESSING LIGHT SENSITIVE FILM
Filed June 4, 1965 11 Sheets-Sheet 5

FIG. 7

INVENTOR.
GUNTHER SCHMIDT
BY

March 12, 1968 G. SCHMIDT 3,372,630
APPARATUS FOR PROCESSING LIGHT SENSITIVE FILM
Filed June 4, 1965 11 Sheets-Sheet 6

FIG. 8

INVENTOR.
GUNTHER SCHMIDT
BY

FIG. 9

March 12, 1968 G. SCHMIDT 3,372,630
APPARATUS FOR PROCESSING LIGHT SENSITIVE FILM
Filed June 4, 1965 11 Sheets-Sheet 8

INVENTOR.
GUNTHER SCHMIDT
BY

March 12, 1968 G. SCHMIDT 3,372,630
APPARATUS FOR PROCESSING LIGHT SENSITIVE FILM
Filed June 4, 1965 11 Sheets-Sheet 10

INVENTOR.
GUNTHER SCHMIDT
BY

FIG. 15

United States Patent Office 3,372,630
Patented Mar. 12, 1968

3,372,630
APPARATUS FOR PROCESSING LIGHT SENSITIVE FILM
Gunther Schmidt, Scarborough, Ontario, Canada, assignor to Houston Schmidt Limited, Toronto, Ontario, Canada
Filed June 4, 1965, Ser. No. 461,463
15 Claims. (Cl. 95—94)

ABSTRACT OF THE DISCLOSURE

A strip of light sensitive film having two major surfaces and two side edges is processed in apparatus including a housing having walls that define at least one treating chamber. The strip is passed into the treating chamber through a slit in one wall and out of the treating chamber through a slit in another wall. A processing liquid is kept in the treating chamber. A gas is blown through the slits into the treating chamber and prevents the processing liquid from escaping via the slits, the gas being vented from the treating chamber. A dryer is positioned to receive the wet strip processed in the treating chamber. The dryer includes a number of spaced apart members having slits extending therethrough through which the strip passes. A strip drying gas is blown into the slits and is directed against the two major surfaces of the strip and causes the strip to float within the slits extending through the aforementioned members.

---

This invention relates to the art of processing light sensitive film. More particularly, this invention relates to new and useful methods and apparatus for developing exposed light sensitive films.

Conventional film processing equipment generally consists of a plurality of tanks or treating chambers containing different film processing liquids, e.g., developer, fix, wash and hypo clear, and a plurality of driven rollers over which the film passes in a generally sinusoidal path, the film dipping into and passing through the various liquids in the tanks in sequence before being passed to a drying chamber. Such equipment has many disadvantages. One of the main disadvantages is that the wet film contacts the surfaces of the rollers during processing, and this may lead to scratching or marring of the film. Furthermore, if there is any difference in the speed of rotation of the various rollers, distortion of the image on the film may result. Other disadvantages of this type of equipment are set out in Canadian Patents Nos. 657,460 and 683,989 issued Feb. 12, 1963 and Apr. 7, 1964 and assigned to Houston Schmidt Limited.

In accordance with this invention, there are provided methods and apparatus which enable film to be processed without the major surfaces thereof coming into contact with any solid object when such major surfaces are wet. Such methods and apparatus also enable film to be processed without any danger of image distortion due to a differential in roller speed, since rollers are not required to contact wet film in the practice of this invention.

Conventional film processing equipment generally is bulky in nature, and, for this reason, cannot be used for "in-flight" processing, for example, or in other applications where space is limited. In accordance with this invention, there is provided equipment for developing exposed film which can be made sufficiently small to enable it to be carried in a photographic survey aeroplane, for example, thus permitting "in-flight" processing to be carried out. This is achieved, in part, by providing equipment wherein the film passes along a straight, rather than sinusoidal, path during processing. This feature itself also contributes to a more simplified processor design.

Since, in the practice of this invention, it is possible to keep the film untouched by any solid surface from the time that it enters the processor until it is in a developed dry condition, the film can be processed using considerably higher temperatures than can be used with conventional "roller" machines, and, as is well known, higher temperatures are synonymous with faster processing.

Equipment embodying this invention can be designed so that there is only an inch or so of film not in processing between adjacent chemical tanks, as contrasted to the foot or so of film not in processing between the chemical tanks of conventional equipment. This is another factor contributing to the relatively small size which equipment embodying this invention can assume, and also contributes to increasing the efficiency of the film processing operation.

In practising this invention, the film processing liquids may be sprayed against the film or may be in turbulent motion. This promotes quick and deep penetration of the emulsion and uniformity in processing all parts of the emulsion.

A very important feature of the instant invention is the means and method employed to prevent chemical carry-over on the film surfaces from one treating chamber to the next. In accordance with this invention, this effect, and consequently chemical contamination, is minimized by what could be termed "gas seals" at the film inlets and outlets of the treating chambers. These "gas seals" not only fulfill the function of liquid separation, but also serve a film transporting function, as well as acting as "gas knives."

The practice of this invention permits the application of "heat shock" developer treatment (several zones for the application of high temperature chemical solutions separated by cool separation zones). Such treatment contributes to short processing times and, therefore, to smaller equipment design.

Another feature of equipment embodying this invention is that it can be designed to permit rewinding of the processed film through the processor on its original spool, thus reducing handling damage. This is achieved by dropping the levels of the various liquids in the treating chambers below the level of the film before rewinding.

In one embodiment of this invention the film is supported on liquid cushions of developer, fix, etc. which may be very thin, e.g., of the order of 0.0015 to 0.005 inch above and below the major surfaces of the film. Thus, a minimum of processing liquids are required, even for wide based films.

In brief, in accordance with this invention there is provided apparatus for processing a strip of light sensitive film having two major surfaces and two edges. The apparatus includes a housing having walls defining a treating chamber. The walls have two spaced apart slits therein each of a size sufficient to permit passage of the strip therethrough and each communicating in fluid-flow relationship with the treating chamber and adapted to permit passage of the strip into and out of the housing. The position of the slits relative to each other is such that after passage of the strip into the housing through either of the slits, the strip is obliged to pass through the treating chamber before passing out of the housing through the other of the slits. Means are provided for maintaining in the treating chamber a liquid for processing the strip of light sensitive film, this liquid being so mantained in the chamber during processing of the strip of light sensitive film. Means also are provided for blowing gas through the slits into the treating chamber with sufficient force to prevent the escape of liquid from the treating chamber through the slits. The apparatus includes venting means for permitting gas introduced into the treating chamber through the slits to exhaust from the treating chamber.

This invention will become more apparent from the following detailed description, taken in conjunction with the appended drawings, in which.

Figure 1:
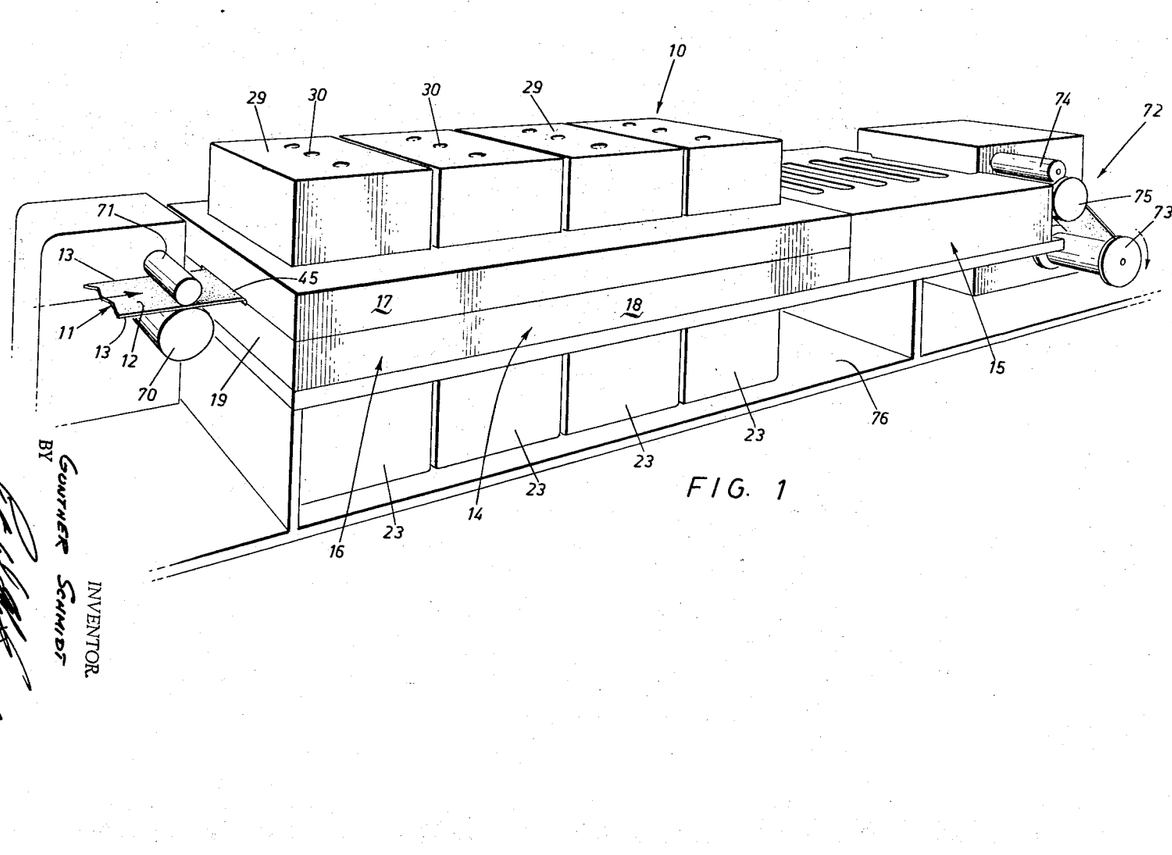
FIGURE 1 is a perspective view of one form of apparatus embodying this invention.

Referring now to FIGURE 1, there is shown one form of apparatus 10 for processing a strip 11 of light sensitive film having two major, opposite surfaces 12 and two side edges 13.

The apparatus includes what may be termed generally a wet processing section 14 and a drying section 15.

Wet processing section 14 includes a generally rectangular housing 16 formed by an upper plate 17 and a lower plate 18 having facing surfaces which abut each other in sealed, liquid-tight relationship. Bolts or other fastening devices (not shown) are employed to hold plates 17 and 18 together. Housing 16 has two end walls 19, only one of which is shown, and the other of which abuts drying section 15, and three intermediate walls 20 (FIGURE 2), only one of which is shown. End walls 19 and intermediate walls 20 are formed partly by plate 17 and partly by plate 18 and define four treating chambers, only two of which are shown, and which are designated 21 (FIGURE 3). Treating chambers 21 are positioned end-to-end one after the other. Each of treating chambers 21 is identical, so that a description of one treating chamber will suffice for all.

Positioned below each treating chamber is a separate reservoir indicated in FIGURE 1 by the reference numeral 23. Affixed to lower plate 18 below each treating chamber are liquid collecting plates, only two of which are shown, and which are designated 27 (FIGURE 3). These collecting plates have downwardly inclined bottom walls leading to openings 28 (FIGURE 3). It is to be understood that each collecting plate 27 is within the confine of a different reservoir 23, and that liquid accumulating in the chambers 39 (FIGURE 3) bounded by collecting plates 27 is returned to the various reservoirs through openings 28.

Secured to upper plate 17 above each of the treating chambers and enclosing the open top side thereof are hoods 29. The top wall of each of these hoods is provided with vent openings 30 which permit gas to be exhausted from the various treating chambers. Baffles 33 and 34 (FIGURE 3) are formed integral with each hood in the path of gas escaping from a treating chamber through openings 30 in the hood covering the treating chamber. These baffles intercept liquid entrained in the escaping gas and cause it to return to the treating chamber, the downward inclination of baffles 33 assisting in this function.

Figure 2:
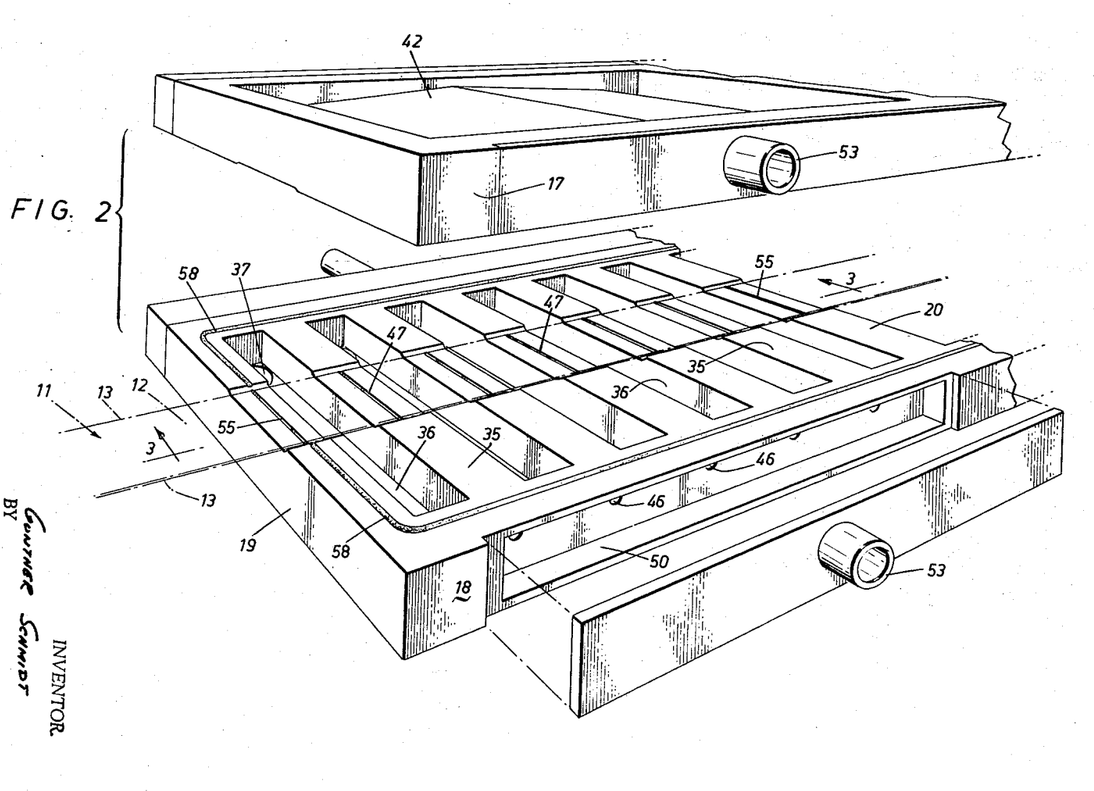
FIGURE 2 is an exploded perspective view illustrating a part of the embodiment of the invention shown in FIGURE 1.
Figure 3:
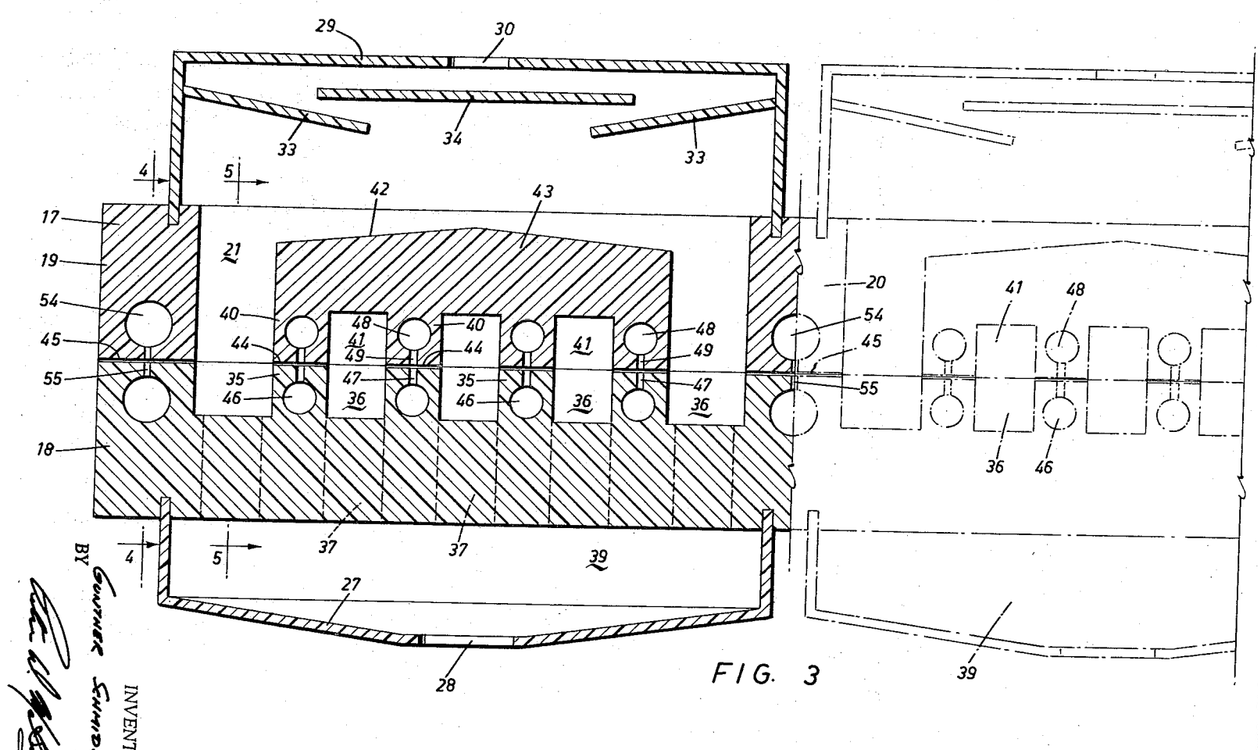
FIGURE 3 is a section taken along line 3—3 in FIGURE 2.

Referring to FIGURES 2 and 3, in each treating chamber 21 lower plate 18 has upstanding cross pieces 35 positioned in spaced apart parallel relationship to each other. Cross pieces 35 are separated by troughs 36. At both ends of troughs 36 channels 37 in plate 18 are provided and communicate with chamber 39 defined by collecting plate 27.

Upper plate 17 in each treating chamber 21 has a plurality of cross pieces 40 depending downwardly from member 43 and positioned in spaced apart parallel relationship with respect to each other and separated from each other by channels 41. It will be noted that the upper surface 42 of member 43 is of roof-like configuration to permit liquid intercepted by baffles 33 and 34 to drain into troughs 36 at the inlet and outlet ends of the treating chamber. It also should be noted that cross pieces 35 and 40 register with each other when plates 17 and 18 are clamped together.

The central areas of cross pieces 35 and 40 are recessed to define slits 44, which are of a size sufficient to permit passage of film strip 11 therethrough. Each one of slits 44 is aligned with adjacent slits 44, so that all slits 44 lie in a straight line in a flat, horizontal plane. Slits 45 of the same size as slits 44 are provided in each end wall 19 and in each intermediate wall 20. Slits 45 also are aligned with slits 44 and lie in the same straight line and horizontal plane as slits 44.

Extending into and for part of the length of cross pieces 35 are circular channels 46 which communicate with channels 47 opening into slits 44 at right angles. Similarly, in upper cross pieces 40 and extending part of the lengths thereof are circular channels 48 which communicate with channels 49 opening into slits 44 at right angles.

Figure 5:
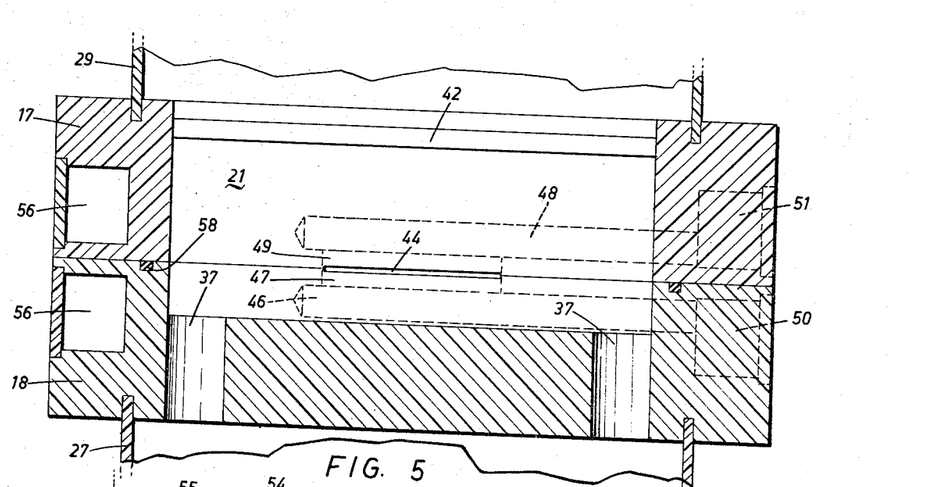

As best shown in FIGURE 2, channels 46 communicate with a header compartment 50 (a separate one for each treating chamber) in lower plate 18, while, as shown in FIGURE 5, channels 48 communicate with a header compartment 51 (a separate one for each treating chamber) in upper plate 17. Header compartments 50 and 51 extend slightly less than the length of a treating chamber and are closed at both ends.

Each reservoir 23 is provided with a pump 52 (FIGURE 15), only two of which have been shown for the purpose of clarity. For purpose of simplicity only two of the four treating chambers have been shown in FIGURE 15. Pumps 52 are connected by tubing 53 to the various headers 50 and 51 and pump liquid to these headers from reservoirs 23, the headers 50 and 51 associated with the various treating chambers 21 being separate from each other, as aforementioned, and obtaining liquid from different reservoirs, of course.

Figure 4:
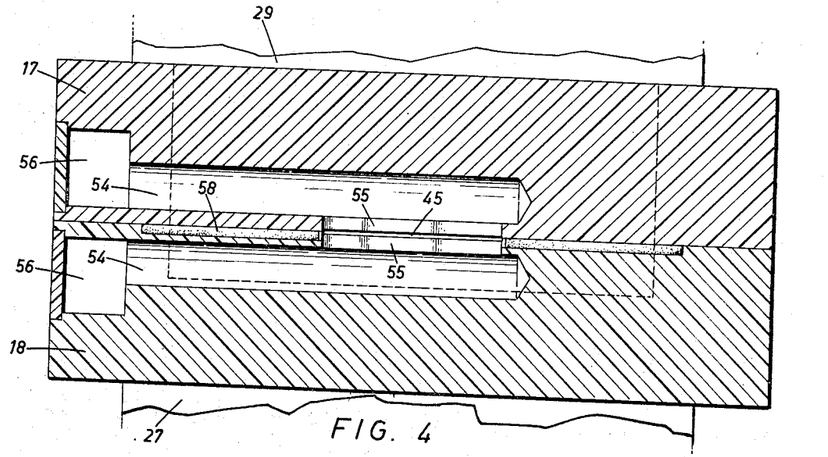
FIGURES 4 and 5 are sections taken along line 4—4 and 5—5 in FIGURE 3.
Figure 15:
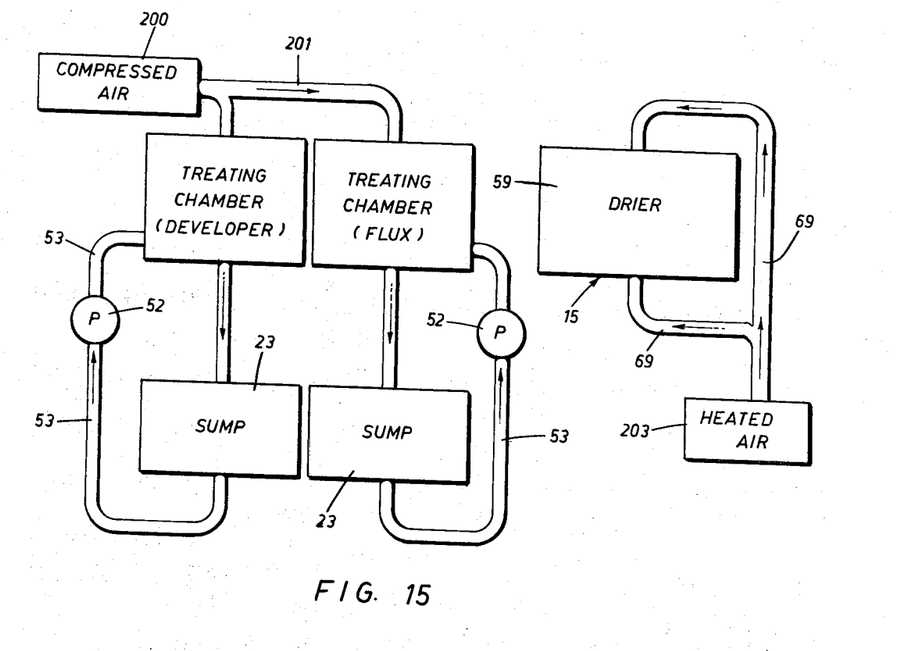
FIGURE 15 is a schematic representation of the two embodiments of the invention.

Positioned in each of end walls 19 and intermediate walls 20 both above and below slits 45 are circular channels 54 that extend part of the length of walls 19 and 20 and which communicate with channels 55 that open into slits 45 at right angles. As best shown in FIGURE 4, channels 54 communicate with headers 56 that extend just less than the length of and are positioned in upper and lower plates 17 and 18 respectively. Both ends of each header 56 may be closed, while a suitable gas, such as air, for example, may be supplied under pressure to the headers 56, the gas pressure in both headers 56 being substantially the same. The air for supply to headers 56 may be obtained from any, preferably regulatable, compressed air source 200 (FIGURE 15) connected to headers 56 via tubing 201 (FIGURE 15).

The means for sealing plates 17 and 18 consists of an O-ring type seal 58 which is shown in FIGURE 2. Seal 58 extends around the periphery of each treating chamber and is interrupted only by slits 45.

Means (not shown) may be provided for heating the various liquids in reservoirs 23 to different temperatures. The first reservoir may contain a developing liquid, the second a fixing liquid, the third a washing solution, and the fourth a hypo clear solution.

Figure 12:
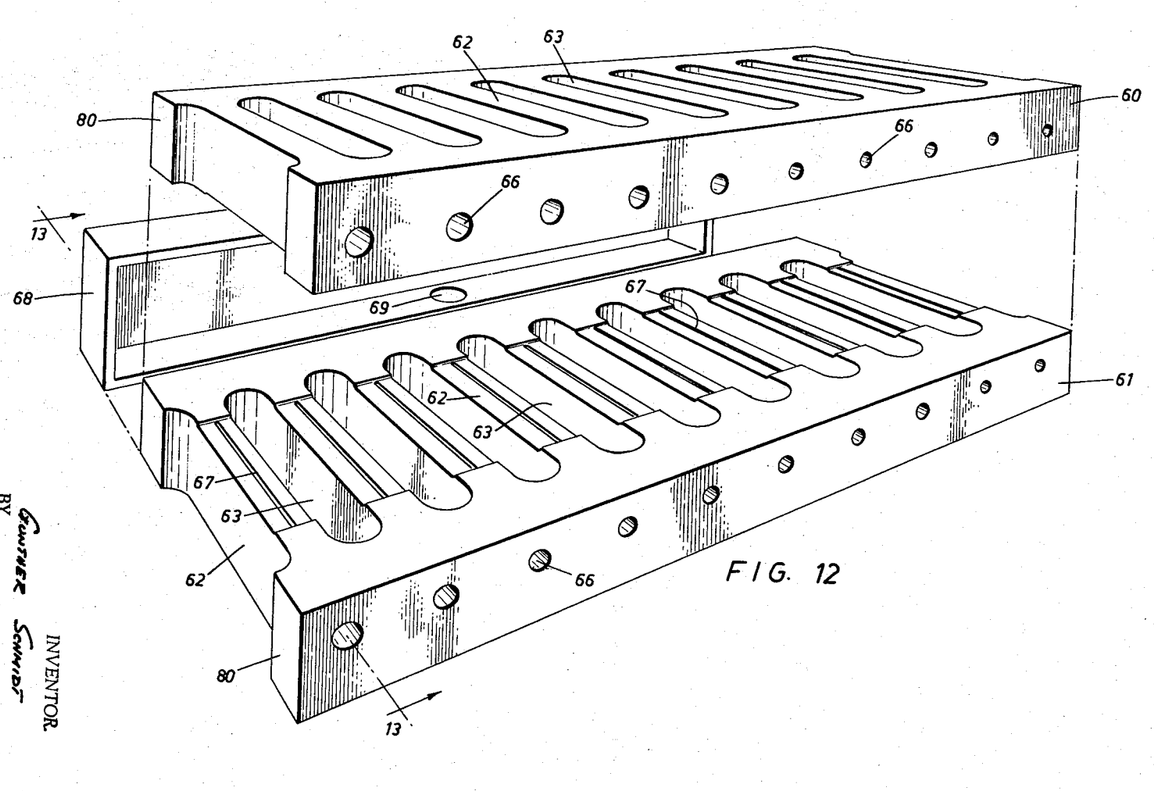
FIGURE 12 is an exploded perspective view of a film drying equipment which may be employed with either of the foregoing embodiments of this invention.
Figure 13:
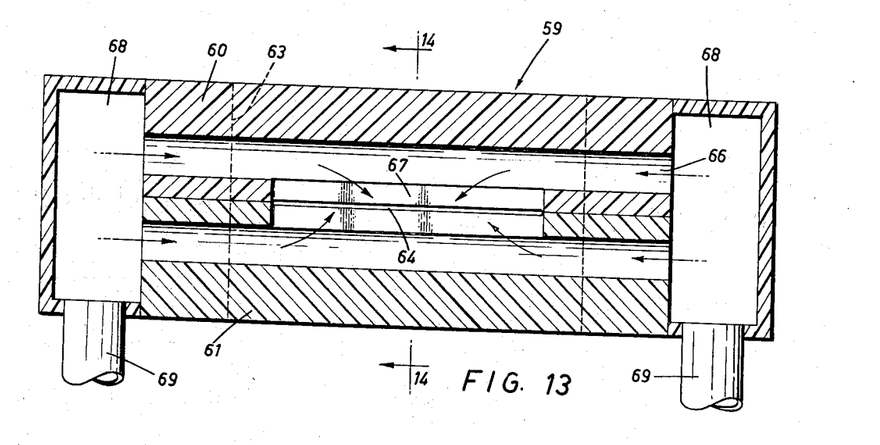
FIGURE 13 is a section taken along line 13—13 in FIGURE 12.
Figure 14:
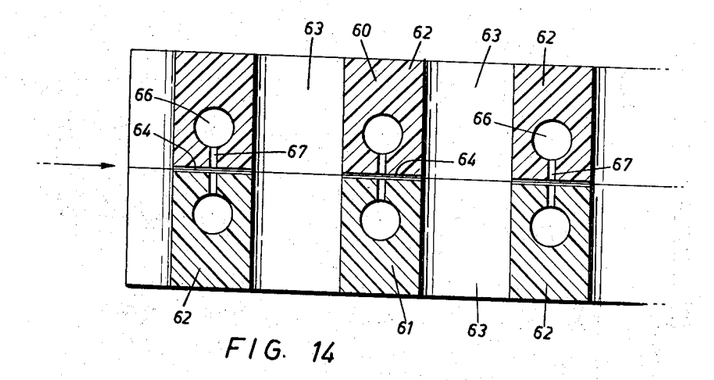
FIGURE 14 is a section taken along line 14—14 in FIGURE 13.

Drying section 15 is best shown in FIGURES 12 to 14 and consists of a housing 59 formed by an upper plate 60 and a lower plate 61 which abut together, as best shown in FIGURE 13. Upper and lower plates 60 and 61 consist of parallel, spaced apart, identical, cross pieces 62 separated from each other by exhaust channels 63. The cross pieces are recessed centrally to define slits 64 which are aligned with each other and lie in a straight line in a flat horizontal plane, it being understood that slits 64 are aligned with slits 44 and 45 and are of substantially the same size as slits 44 and 45. The inlet end wall 80 of drying section 15 abuts the outlet end wall 19 of wet processing section 14.

In cross pieces 62 there are provided circular channels 66 communicating with channels 67 that open into slits 64 at right angles. Channels 66 extend the length of cross pieces 62. Header compartments 68 are provided along each side of housing 59 and communicate with channels 66. Hot air or any other suitable gaseous drying medium is supplied to headers 68 at a balanced pressure via tubes 69 from any, preferably regulatable, source of heated compressed air 203 (FIGURE 15).

It should be understood that plates 60 and 61 are identical, and that when they are placed together, channels 63 in both plates are aligned, as are cross pieces 62. Any suitable means such as bolts or other fastening devices (not shown) may be employed to hold plates 60 and 61 together and to fasten headers 68 thereto.

Referring again to FIGURE 1, rotatable rubber covered rollers 70 and 71, between which film strip 11 passes, are provided at the inlet end of the apparatus, roller 71 being an idler roller and roller 70 a drag roller. A suitable winding mechanism 72 is provided at the other end of the apparatus, this winding mechanism consisting of a winding spool 73 driven by an electric motor (not shown), for example, and rollers 74 and 75 between which the processed film passes.

As best shown in FIGURE 1, a frame 76 is provided which supports all of the aforementioned equipment.

Housing 16 and housing 59 may be formed from any suitable rigid plastic material, for example. In order to prevent light from entering the apparatus a light-tight casing may be provided over all parts of the apparatus which would otherwise permit light to enter and damage the film being processed.

In using the equipment described hereinbefore, the various liquids in reservoirs 23 are heated to suitable temperatures and are maintained at these temperatures by any known means, e.g. by thermostatically controlled, immersion type, electric heating elements. Compressed air or other suitable gas than is supplied to headers 56 from source 200 via tubing 201, and heated air under pressure is supplied from source 203 via tubes 69 to headers 68.

Figure 6:
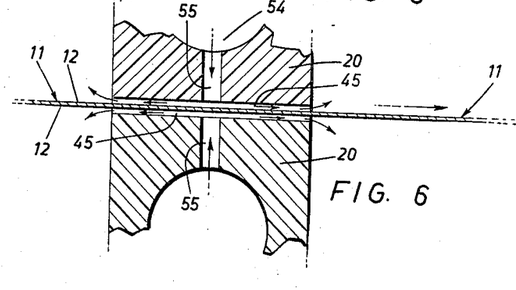
FIGURE 6 is a view similar to FIGURE 3 showing a part of the equipment illustrated in FIGURE 3 in greater detail.

The air pressure in both headers 56 is the same, and the air passes from headers 56 through circular channels 54 and is directed by channels 55 into slits 45. The degree of air pressure in slits 45 is an important feature of this invention, and the air pressure in slits 45 during processing of film must be greater than the pressure in at least the portions of treating chambers 21 which are adjacent to slits 45. In this manner the air acts as a seal to prevent the escape of liquids from treating chamber 21 through slits 45, and therefore prevents carry-over of chemicals from one treating chamber to the next. How this is achieved is best shown in FIGURE 6 which shows a part of an intermediate wall 20. The air flow from channels 54 and 55 strikes major surfaces 12 of film 11 from opposite sides thereof and divides in the manner shown in FIGURE 6. The air blows through slits 45 into the treating chambers 21 adjacent wall 20 with sufficient force to prevent liquid from passing from one treating chamber to the next. At the same time, however, this air serves to prevent substantial chemical carry-over by the film from one treating chamber to the next. Furthermore, since the air pressure below and above film 11 is substantially the same, the film floats within slits 45 with both major surfaces 12 thereof out of contact with the surfaces defining slits 45. Precisely the same floating action takes place in housing 59 where heated air under balanced pressure is supplied from headers 68 through channels 66 and is directed through channels 67 into slits 64 to dry the wet film.

Once air at the required pressure has been supplied to slits 45 in the manner outlined hereinbefore, the various liquid pumps 52 can be started. These pumps pump the heated liquids in reservoirs 23 into their corresponding treating chambers via tubing 53. Thus, developer liquid in the first reservoir is pumped via pump 52 and tubing 53 to headers 50 and 51 for the first chamber 21. The pressure in headers 50 and 51 is the same. The developer liquid then passes via channels 46, 47, 48 and 49 into slits 44, where it is directed against both major surfaces 12 of film 11 from opposite sides thereof. The film floats in slits 44 in the same manner as it floats in slits 45 and 64. In the same manner fixing solution is supplied to the second treating chamber, washing solution to the third, and hypo clear solution to the fourth.

It should be understood that these liquids are circulated continuously in the various treating chambers 21. Taking the developer treating chamber as exemplary, the developer solution is directed at both major surfaces 12 of film strip 11 by flowing through channels 49 and 47 into slits 44. The flow of solution divides in each slit 44 in the same way as the air flow divides in slits 45. The solution discharges into troughs 36, passes through channels 37 into chamber 39 and is returned to the developer solution reservoir via opening 28 in collecting plate 27.

Since slits 44 are only slightly larger in size than film strip 11, there are only very thin cushions of liquid above and below film strip 11 as it passes through any slit 44.

The fact that the various solutions are impinged against surfaces 12 is of importance in speeding the processing of the film.

The fact that the solution in any one treating chamber is directed at film strip 11 at a plurality of spaced apart locations is of importance in preventing upward bowing of the film in the treating chambers. This might occur if each treating chamber merely contained a bath of solution through which the film was passed, since air from slits 45 then could pass under the film strip and lift it upwardly.

In order to thread film 11 through the equipment a relatively rigid strip of material, such as a suitable metal, for example, may be attached to the leader of film 11. The strip of metal is pushed through slits 45, 44 and 64, and the leader is pulled through the equipment and wound up on take-up spool 73, it being understood that the spool of unexposed and undeveloped film is mounted on a suitable spindle (not shown) at the inlet end of the equipment. A light-tight casing then is placed over the equipment, and spool 73 rotated at a suitable speed drawing film strip 11 through treating chambers 11 in sequence.

Air entering the various treating chambers via slits 45 is exhausted through openings 30. Liquid entrained in this air is intercepted by baffles 33 and 34 and is returned to the respective treating chamber and thence to the reservoir for the treating chamber.

Film strip 11 is dried in drying section 15, the heated air being exhausted via channels 63.

After a spool of unexposed film has been so developed, the light-tight casing over winding mechanism 72 may be opened and the spool 73 of developed film removed.

It will be understood that the aforementioned light-tight casing may be permanently mounted over wet processing section 14 and drying section 15, as well as over the film loading and winding mechanisms, with access to the loading and winding mechanisms being through doors.

Referring now to FIGURES 7–11, where another embodiment of this invention is shown, a plurality of individual, generally block-shaped housings 100 are provided. Each of housings 100 is identical. Consequently only one of the housings will be described in detail.

Figure 8:
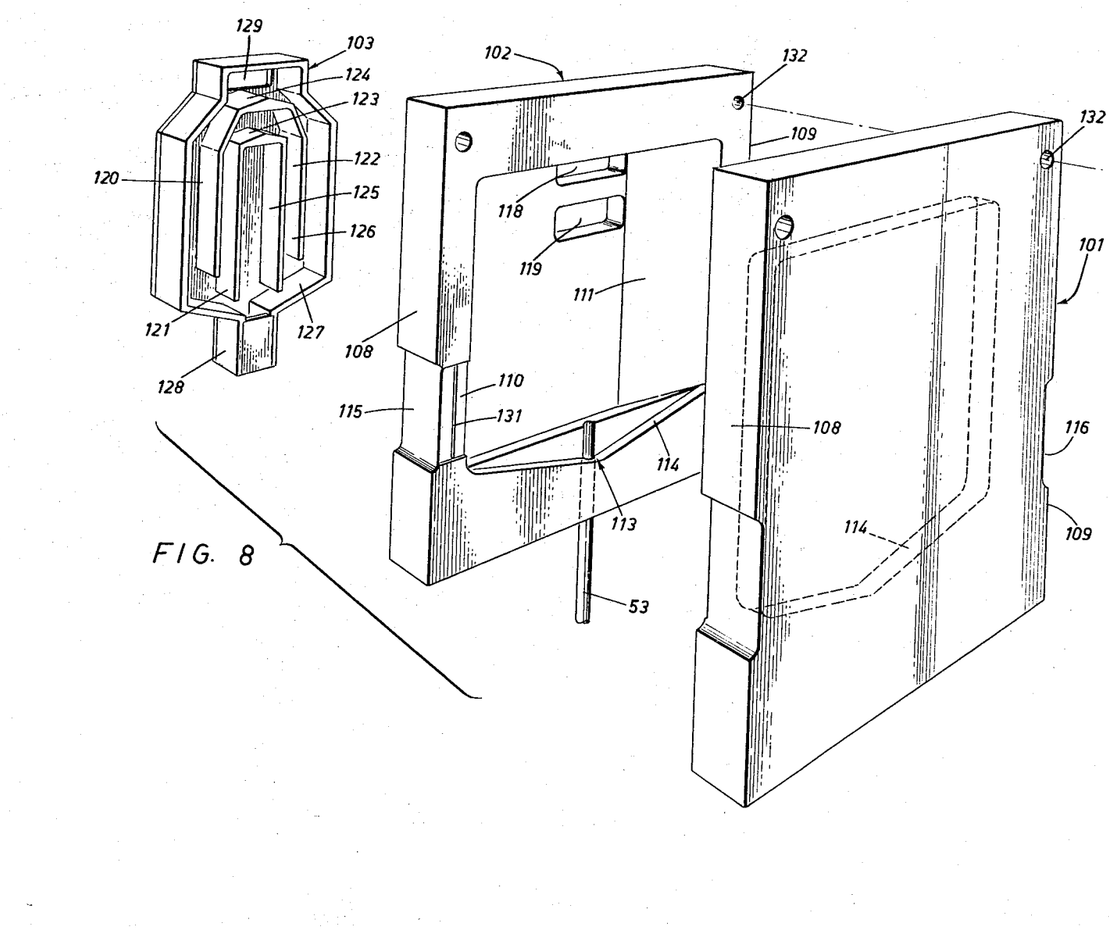
FIGURE 8 is an exploded perspective view illustrating in greater detail a part of the equipment shown in FIGURE 7.

As best seen in FIGURE 8, housing 100 consists of a front plate 101, an intermediate plate 102 and a back plate 103.

Figure 9:
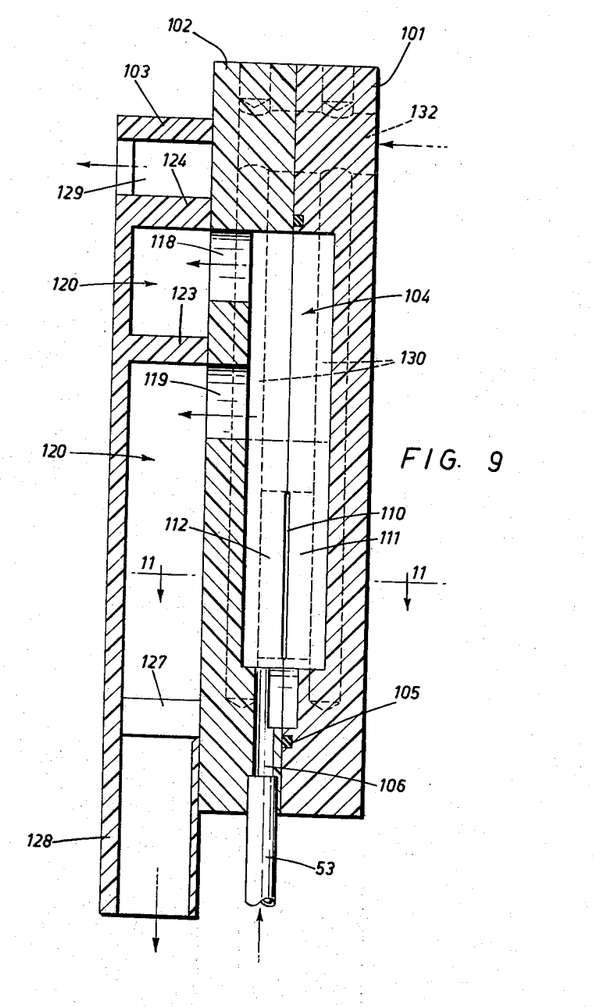
FIGURE 9 is a section taken along line 9—9 in FIGURE 7.
Figure 10:
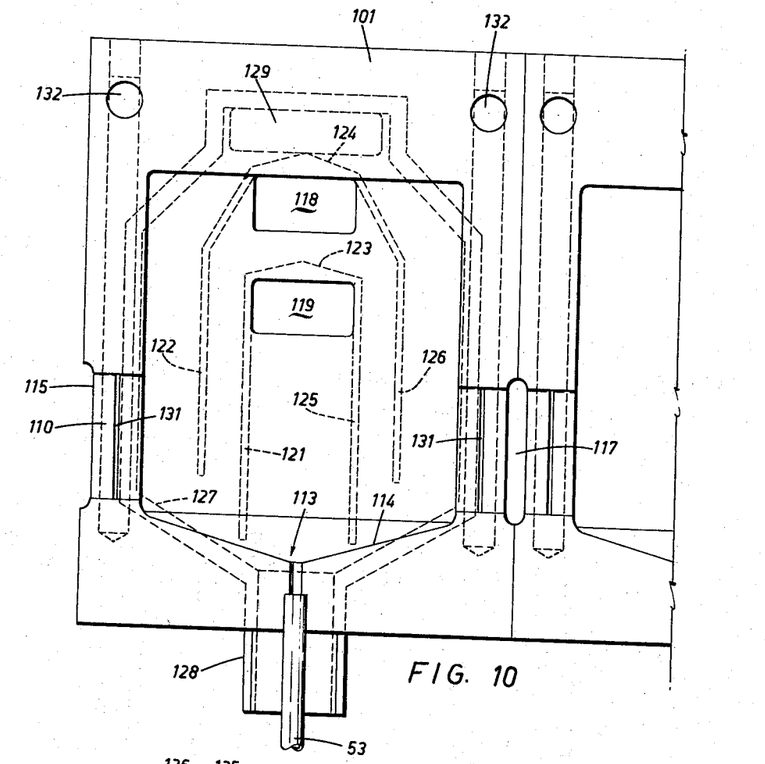
FIGURE 10 is a section taken along line 10—10 in FIGURE 7.

Plates 101, 102 and 103 are secured together, in the positions shown in FIGURE 9, by bolts (not shown) or other suitable means, and an O-ring type seal 105 is provided between the abutting surfaces of plates 101 and 102 to prevent escape of liquid from the treating chamber 104 provided by recesses in plates 101 and 102.

Communicating with chamber 104 is a channel 106 which is supplied with liquid from a liquid inlet tube 53.

In each of end walls 108 and 109 of plates 101 and 102 recesses are provided which define slits 110 that are slightly larger in size than film strip 11. Slits 110 are directed opposite each other and extend from outside housing 100 into treating chamber 104.

Figure 11:
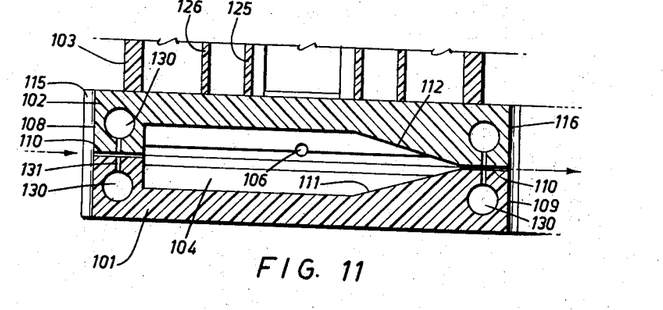
FIGURE 11 is a section taken along line 11—11 in FIGURE 9.

As best shown in FIGURE 11, plates 101 and 102 are bevelled towards slit 110 in end walls 109 at 111 and 112 respectively. The bottom wall 113 of chamber 104 is bevelled upwardly at 114 towards slit 110 in end walls 109. These bevelled surfaces facilitate the guiding of film strip 11 into slot 110 in end walls 109 after it has passed through slit 110 in end walls 108 and through treating chamber 104.

Figure 7:
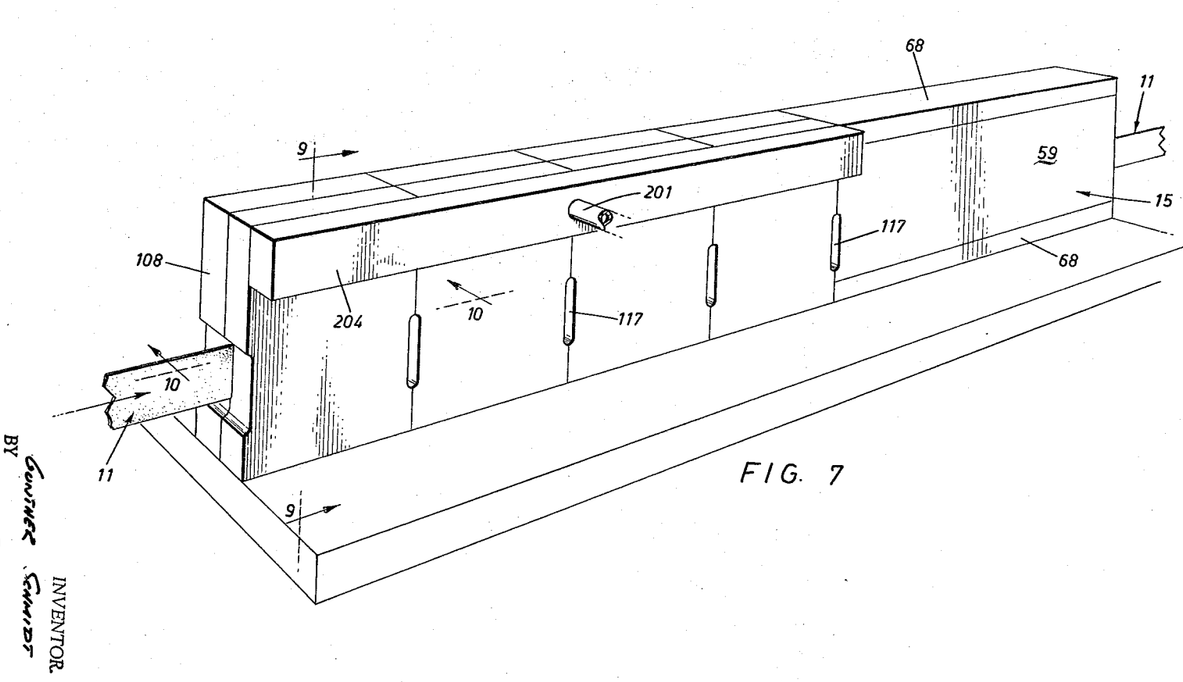
FIGURE 7 is a perspective view illustrating another embodiment of this invention.

End walls 108 and 109 also are recessed at 115 and 116 repsectively in such a manner that when housing 100 are aligned as shown in FIGURE 7, recesses 108 of the housings co-operate with recesses 109 of adjacent housings 100 to define exhaust channels 117.

Plate 102 has upper and lower openings 118 and 119 therein extending between chamber 104 and the compartment 120 defined between plates 102 and 103.

Referring to FIGURE 8, plate 103 includes two inverted, generally U-shaped baffles 121 and 122 both having generally roof-shaped walls 123 and 124 respectively and downwardly depending side walls 125 and 126 respectively. The bottom wall 127 of plate 103 inclines downwardly to a liquid discharge tube 128. A vent 129 is provided in plate 103 above baffle 122. Opening 118 discharges gas from treating chamber 104 into the channel between baffles 121 and 122.

Beneath each housing a reservoir 23 (FIGURE 15) of the type indicated in FIGURE 1 is provided. For each housing there also is a pump 52 (FIGURE 15) which pumps the liquid in the reservoir into treating chamber 104 via tube 53 and channel 106, it being understood that developing solution is pumped into the first treating chamber 104, fixing solution into the second, washing solution into the third and hypo clear (optional) into the last treating chamber. These various liquids may be heated individually as discussed hereinbefore in connection with the first described embodiment of this invention.

As best shown in FIGURE 11, in end walls 108 and 109 of plates 101 and 102 circular channels 130 are provided, channels 130 communicating with channels 131 that open into slits 109 at right angles. A gas, such as air, for example, is supplied under pressure to channels 130 through channels 132 extending from one side of plate 101 through plate 101 and part way into plate 102. This air may be supplied to channels 102 from a common air supply header 204 (FIGURE 7) for all of channels 132 in housings 100. Any, preferably regulatable, source of compressed air 200 (FIGURE 15) may be connected via tubing 201 to supply the aforementioned header.

The dryer section 15 used in this embodiment of the invention is the same as that shown in FIGURES 12, 13 and 14, but it is oriented so that slits 64 thereof lie in a vertical rather than horizontal plane, it being understood that slits 110 and 64 lie in a straight line in a flat vertical plane.

For the sake of simplicity no device for winding the processed film has been shown in FIGURE 7, although such may be provided, of course.

The four housings 100, the first to contain developer, the second fixing solution, the third washing solution, and the fourth hypo clear solution (optional), are positioned end-for-end, as shown in FIGURE 7, and are followed by drying section 15.

In processing film using the equipment illustrated in FIGURES 7–11, the various processing liquids are first heated to appropriate temperatures in their reservoirs. Thermostatically controlled, electrical, immersion heaters may be employed for this purpose. Compressed air at appropriate pressure then is supplied to channels 132 from source 200 via tubing 201, passes through channels 130 and is directed by channels 131 into slits 110. The leader for film 11 now may be passed through the equipment employing, if necessary, a relatively rigid metal strip fastened to the leader. The leader is fastened to some suitable take-up device after it emerges from dryer 15.

Following the foregoing steps, heated air under pressure is supplied to headers 68 from source 203 via tubing 69, and the various processing fluids are pumped into the various treating chambers 104 by pumps 52. Film 12 then is drawn through the treating chambers in sequence by the take-up device and at an appropriate speed.

The volume of liquid maintained in each chamber 104 is such that, if static, it would fill chamber 104 to opening 119. The liquid in each chamber 104 overflows through opening 119 and is returned via tube 128 to its reservoir. The liquid is pumped continuously from its reservoir via tube 53 and channel 106 to its chamber 104.

Air exhausts from chamber 104 via openings 118 and is constrained by baffles 121 and 122 to travel in a tortuous path before being exhausted to the atmosphere via opening 129. Liquid entrained in the air is intercepted by the baffles and returned to the appropriate reservoir via tube 128.

The air directed into slits 110 must be at a pressure such that the air pressure in slits 110 is greater than the static head of liquid in treating chamber 104 above the lowest part of slits 110. In other words, the force of the air directed into treating chamber 104 through slits 110 is sufficient to prevent liquid escaping from the treating chamber. The functions performed by the air introduced into slits 110 are the same as those performed by the introduction of air into slits 45 in the other embodiment of this invention previously described. In addition, however, air entering chamber 104 from slits 110 causes violent agitation of the liquid in chamber 104, thus promoting the action of this liquid in processing the film. The portion of the air introduced into slits 110, but which does not enter a treating chamber, is exhausted on both sides of the apparatus via exhaust channels 117.

Drying section 15 performs the same function as outlined hereinbefore.

It will be noted that film strip 11 floats in slits 110 because air under balanced pressure is directed against both major surfaces 12 thereof via channels 131. The tension on strip 11 prevents it from touching the side walls of treating chambers 104.

It will be appreciated, of course, that a suitable light-tight casing may be provided for the apparatus of FIGURE 7, access to the loading and winding mechanisms (not shown) being through doors in this casing.

The embodiment of this invention shown in FIGURES 7–11 offers the advantage of permitting film strip 11 to be rewound on its original spool after processing. Thus, after the film has been developed and wound up on the take-up spool, the pumps may be stopped and chambers 104 drained of the various solutions. Air is continued to be supplied to slits 110 and 64, however. The now empty spool at the loading end of the apparatus which is still connected to the film strip is driven in the reverse direction to its direction of rotation during processing, and the motor driving the take-up spool is disconnected therefrom and permited to rotate freely. In this manner the film strip may be rewound on its original spool passing in reverse direction through the apparatus. This feature is of a particular importance in processing films which are now available packaged in their own light-tight cassettes, since these films can be fully developed and rewound in their own cassettes without ever being touched.

While film processing equipment has been disclosed which permits developer, fixing solution, washing solution and hypo clear solution to be applied sequentially to film strip, it is to be understood that this invention is not limited thereto, and different processing solutions may be substituted, or this invention may be practised by applying only a single solution to the film in the manner indicated, the other solutions being applied in other ways.

In both embodiments of the invention film strip 11 contacts no solid surface while it is wet.

While it is preferred for film strip 11 to pass through the apparatus in a straight line, this is not essential, and the path followed by film strip 11 in passing through the apparatus may be other than straight, if desired.

In both embodiments of the invention there is only a small distance separating adjacent treating chambers. Thus, only a small percentage of film strip 11 passing through the apparatus is not "being processed."

It also should be noted that both embodiments of the invention hereinbefore described can be tilted through substantial angles without loss of processing solutions. This is of importance for an airborne film processor.

While preferred embodiments of this invention have been disclosed herein, those skilled in the art will appreciate that changes may be made therein without departing from the spirit and scope of this invention as defined in the appended claims.

What I claim as my invention is:

1. Apparatus for processing a strip of light sensitive film having two major surfaces and two side edges, which comprises; a housing having walls defining at least one treating chamber, said walls having two spaced apart slits therein each of a size sufficient to permit passage of said strip therethrough and each communicating in fluid-flow relationship with said treating chamber and adapted to permit passage of said strip into and out of said housing, the position of said slits relative to each other being such that after passage of said strip into said housing through either of said slits said strip is obliged to pass through said treating chamber before passing out of said housing through the other of said slits; means for maintaining a liquid for processing said strip of light sensitive film in said treating chamber during processing of said strip of light sensitive film; means for blowing gas through said slits into said treating chamber with sufficient force to prevent the escape of said liquid from said treating chamber through said slits; venting means for permitting gas introduced into said treating chamber through said slits to exhaust from said treating chamber; and baffle means positioned in the path of gas attempting to escape from said treating chamber through said venting means.

2. Apparatus according to claim 1 wherein said gas is air.

3. Apparatus according to claim 1 wherein said means for maintaining said liquid in said treating chamber includes means for directing said liquid against said major surfaces of said strip from opposite sides of said strip.

4. Apparatus according to claim 1 wherein said means for maintaining said liquid in said treating chamber includes at least one member positioned in said treating chamber and havng a slit extending therethrough of a size adapted to permit passage of said strip therethrough and through which said strip passes and having channels therein communicating with said slit in said member, said channels being adapted to direct said liquid against said major surfaces of said strip from opposite sides of said strip, and means for supplying to said channels said liquid under sufficient pressure that the force of said liquid acting on one of said major surfaces of said strip is substantially equal and opposite to the force of said liquid acting on the other of said major surfaces of said strip, whereby said strip floats within said slit in said member with said major surfaces out of contact with the surfaces defining said slit in said member.

5. Apparatus according to claim 1 including a device for drying said strip, said device being positioned to receive the wet strip processed in said treating chamber; means for supplying a gaseous strip-drying medium to said device to dry said wet strip; and means permitting said medium to escape from said device.

6. Apparatus according to claim 5 wherein said gaseous drying medium is heated air.

7. Apparatus for processing a strip of light sensitive film having two major surfaces and two side edges, which comprises; a housing having walls defining at least one treating chamber, said walls having two spaced apart slits therein each of a size sufficient to permit passage of said strip therethrough and each communicating in fluid-flow relationship with said treating chamber and adapted to permit passage of said strip into and out of said housing, the position of said slits relative to each other being such that after passage of said strip into said housing through either of said slits said strip is obliged to pass through said treating chamber before passing out of said housing through the other of said slits; means for maintaining a liquid for processing said strip of light sensitive film in said treating chamber during processing of said strip of light sensitive film; means for blowing gas through said slits into said treating chamber with sufficient force to prevent the escape of said liquid from said treating chamber through said slits; venting means for permitting gas introduced into said treating chamber through said slits to exhaust from said treating chamber; and a device for drying said strip, said device being positioned to receive the wet strip processed in said treating chamber and comprising a plurality of spaced apart members each having a slit extending therethrough of a size adapted to permit the passage of said strip therethrough and through which said strip passes, each of said members having channels therein communicating with said slit in said member, said channels being adapted to direct a gaseous strip-drying medium against said major surfaces of said strip from opposite sides of said strip; means for blowing said gaseous strip-drying medium into said channels with sufficient pressure that the force of said gaseous strip-drying medium acting on one of said major surfaces of said strip is substantially equal and opposite to the force of said gaseous strip-drying medium acting on the other of said major surfaces of said strip, whereby said strip floats within said slits in said members with said major surfaces out of contact with the surfaces defining said slits in said members.

8. Apparatus according to claim 7 wherein said means for blowing said gas through slits in said walls includes means for directing said gas against said major surfaces of said strip from opposite sides of said strip.

9. Apparatus according to claim 7 wherein said means for blowing said gas through said slits in said walls includes means for directing said gas against said major surfaces of said strip from opposite sides of said strip, and means for supplying said gas to said means for directing said gas under sufficient pressure that the force of said gas acting on one of said major surfaces of said strip is substantially equal and opposite to the force of said gas acting on the other of said major surfaces of said strip, whereby said strip floats within said slits in said walls with said major surfaces out of contact with the surfaces defining said slits in said walls.

10. Apparatus according to claim 7 wherein said means for maintaining a liquid in said treating chamber comprises means for circulating said liquid through said treating chamber.

11. Apparatus according to claim 7 wherein said means for maintaining a liquid in said treating chamber comprises a reservoir for said liquid, means for pumping said liquid from said reservoir to said treating chamber, and means for returning said liquid from said treating chamber to said reservoir.

12. Apparatus according to claim 7 wherein said means for maintaining a liquid in said treating chamber comprises means for maintaining a volume of said liquid in said treating chamber large enough to have a liquid level above at least a part of said slits in said walls, the pressure of said gas in said slits in said walls being greater than the static head of the part of said liquid above the lowest part of said slits in said walls.

13. Apparatus according to claim 7 wherein said means for blowing said gas through said slits in said walls includes means for directing said gas against said major surfaces of said strip from opposite sides of said strip, and means for supplying said gas to said means for directing said gas under sufficient pressure that the force of said gas acting on one of said major surfaces of said strip is substantially equal and opposite to the force of said gas acting on the other of said major surfaces of said strip, whereby said strip floats within said slits in said walls with said major surfaces out of contact with the surfaces defining said slits in said walls, and wherein said means for maintaining said liquid in said treating chamber includes at least one member positioned in said treating chamber and having a slit extending therethrough of a size adapted to permit passage of said strip therethrough and through which said strip passes and having channels therein communicating with said slit in said member in said treating chamber, said channels in said member in said treating chamber being adapted to direct said liquid against said major surfaces of said strip from opposite sides of said strip, and means for supplying to said channels in said member in said treating chamber said liquid under sufficient pressure that the force of said liquid acting on one of said major surfaces of said strip is substantially equal and opposite to the force of said liquid acting on the other of said major surfaces of said strip, whereby said strip floats within said slit in said member in said treating chamber with said major surfaces out of contact with the surfaces defining said slit in said member in said treating chamber.

14. Apparatus according to claim 13 wherein said walls of said housing define at least first, second and third ones of said treating chambers, said walls having slits therein each of a size sufficient to permit passage of said strip therethrough, said slits in said walls together with said treating chambers defining a path for passage of said strip through said apparatus and through said first, second and third treating chambers in sequence, certain of said slits in said walls being positioned along said path between said first and said second and said second and said third treating chambers; said means for maintaining liquid comprising means for maintaining a developing liquid in said first treating chamber during processing of said strip of light sensitive film, means for maintaining a fixing liquid in said second treating chamber during processing of said strip of light sensitive film, and means for maintaining a washing liquid in said third treating chamber during processing of said strip of light sensitive film.

15. Apparatus according to claim 13 wherein said slits all are positioned in a straight line.

References Cited

UNITED STATES PATENTS

| | | | |
|---|---|---|---|
| 2,842,865 | 7/1958 | Enkelmann | 95—94 |
| 3,027,821 | 4/1962 | Wright | 95—89 |
| 3,060,594 | 10/1962 | Windhorst | 34—156 |
| 3,067,758 | 12/1962 | Hersh | 95—94 |
| 3,192,846 | 7/1965 | Wright | 95—94 |
| 3,245,334 | 4/1966 | Long | 95—89 |

NORTON ANSHER, *Primary Examiner.*

FRED L. BRAUN, *Examiner.*